United States Patent
Huttenlocher (10) Patent No.: US 10,940,810 B2
(45) Date of Patent: Mar. 9, 2021

(54) TRIM ELEMENT ON A VEHICLE AND METHOD OF MANUFACTURING SAME

(71) Applicant: Magna Exteriors GmbH, Sailauf (DE)

(72) Inventor: Marc Huttenlocher, Nürtingen (DE)

(73) Assignee: MAGNA EXTERIORS GMBH, Sailauf (DE)

(*) Notice: Subject to any disclaimer, the term of this patent is extended or adjusted under 35 U.S.C. 154(b) by 282 days.

(21) Appl. No.: 16/106,271

(22) Filed: Aug. 21, 2018

(65) Prior Publication Data
US 2019/0061646 A1    Feb. 28, 2019

(30) Foreign Application Priority Data
Aug. 25, 2017  (DE) .................. 10 2017 214 943

(51) Int. Cl.
| | |
|---|---|
| B60R 13/04 | (2006.01) |
| B60R 13/00 | (2006.01) |
| B60Q 3/00 | (2017.01) |
| B60R 19/18 | (2006.01) |
| B60R 13/02 | (2006.01) |

(52) U.S. Cl.
CPC .............. B60R 13/04 (2013.01); B60Q 3/00 (2013.01); B60R 13/00 (2013.01); B60R 13/005 (2013.01); B60R 19/18 (2013.01); B60R 2013/0287 (2013.01); B60R 2019/1886 (2013.01)

(58) Field of Classification Search
CPC ......... B60R 13/04; B60R 13/00; B60R 13/05; B60R 19/18; B60R 13/005; B60R 2019/1886; B60Q 3/00

USPC ........................................................ 296/1.08
See application file for complete search history.

(56) References Cited

U.S. PATENT DOCUMENTS

| | | | | |
|---|---|---|---|---|
| 2007/0047217 A1* | 3/2007 | Konet | ...................... | B60Q 3/14 362/84 |
| 2010/0321946 A1* | 12/2010 | Dingman | ................ | E05B 85/16 362/501 |
| 2011/0057465 A1* | 3/2011 | Beau | ........................ | B60Q 3/54 296/1.08 |
| 2019/0077337 A1* | 3/2019 | Gervelmeyer | ...... | B32B 17/1077 |

FOREIGN PATENT DOCUMENTS

| | | |
|---|---|---|
| DE | 202012007518 U1 | 10/2012 |
| DE | 112010002578 T5 | 2/2013 |
| DE | 102012003200 A1 | 8/2013 |
| DE | 102014110084 A1 | 1/2016 |
| DE | 102015104299 A1 | 9/2016 |
| DE | 102017214943 A1 | 2/2019 |

OTHER PUBLICATIONS

Search Report from corresponding German Patent Application No. 10 2017 214 943.4.
Search Report dated May 3, 2019 in corresponding German Patent Application 10 2018 213 004.3.

* cited by examiner

*Primary Examiner* — Joseph D. Pape
(74) *Attorney, Agent, or Firm* — Dickinson Wright PLLC (57) ABSTRACT

A trim element on a vehicle is comprised of at least one trim element body and a design area that is modified to individualize the vehicle appearance. The design area includes at least one plastic panel which is structured for a three-dimensional appearance by laser processing, with the outer surface being unaffected.

20 Claims, 5 Drawing Sheets

Fig. 1

PRIOR ART

Fig. 2

PRIOR ART

TRIM ELEMENT ON A VEHICLE AND METHOD OF MANUFACTURING SAME

CROSS-REFERENCE TO RELATED APPLICATIONS

This application claims the benefit and priority of German Application No. 10 2017 214 943.4, filed Aug. 25, 2017, the entire disclosure of which is incorporated herein by reference.

FIELD

The present disclosure relates generally to a trim element on a vehicle. In particular, the trim element of the present disclosure includes at least a trim element body and a design area which is treated to individualize the vehicle appearance or for informational purposes. The present disclosure also relates to a method for producing a trim element on a vehicle.

BACKGROUND

This section provides background information related to the present disclosure which is not necessarily prior art.

The use of electrically powered vehicles not only forces a complete change of the drive system but also influences the external vehicle appearance itself. The traditional "vehicle face" with the dominant radiator grille, which allows air to flow into the vehicle interior to cool the internal combustion engine, becomes superfluous for electric vehicles. However, the shapes and appearance of the radiator grille, in combination with the manufacturer's trademark, are important distinguishing criteria and recognition parameters for vehicle manufacturers.

The function of the bumper covering, however, or the complete front module with bumper covering, headlights, and air intakes for brakes, remains. The approval conditions for electric vehicles are the same as for vehicles with internal combustion engines; thus, pedestrian protection must be ensured. Furthermore, the approval conditions also restrict the attachment of illumination elements.

With plastic panels, it is difficult to meet various approval conditions such as pedestrian protection/pendulum test. As a result of the laser process, however, the structure of the plastic panel may be damaged in such a way that certain areas are defined to break, and the approval conditions may be met more easily.

The freed surface left by the radiator grille is thus available for the exterior design of the vehicle.

Furthermore, surfaces inside the vehicle are also free for design or individualization, as well as for informational devices. Information transmission by the illumination of symbols is often used.

From DE 112010002578T5, a trim component is known. This trim component has a schematic structure made up of a substrate, a mask and a cover layer. The trim component is always backlit. Without backlighting, the structure formed by the mask, for example a logo, may not be recognized.

From DE 102012003200 A1 a translucent body part is known, in which a transparent material is used that is optionally covered by a translucent cover material.

From DE 102014110084 A1 a trim component is known that has a variably translucent layer. Without an illumination source, the structure of the mask used is not discernible; it is visible only if the illumination source is active.

From DE 102015104299 A1 an interior trim for a motor vehicle is known that also has a translucent cover layer.

SUMMARY

This section provides a general summary of the disclosure, and is not a comprehensive disclosure of its full scope or all of its features.

It is an objective of the invention to provide a trim element for a vehicle, which is also suitable for an electric vehicle and also may represent characteristic differentiating features of the vehicle manufacturer and/or decorative and/or informative elements.

In particular, the objective is achieved by means of a trim element on a vehicle, consisting of at least a trim element body and a design area, which is treated to individualize the vehicle appearance, wherein the design area consists of at least one plastic panel consisting of a material suitable for laser engraving, and provides for a three-dimensional appearance by means of inner engraving areas of the plastic panel, with the outer surface remaining unmodified.

The three-dimensional appearance is present in the interior of the plastic panel, and is not present as a three-dimensional structure on the outer surface of the vehicle. As a result, the structure is enclosed and safely protected from environmental influences. The outer surface remains smooth or may also have a structure shaped by injection molding, for example, an anti-slip structure, but is not reworked. In addition, inside the vehicle it is important that the surfaces are protected against wear.

It is advantageous that the design area is incorporated or injected into a trim element body made of a different material. By using different materials, costs may be reduced and high-quality plastic materials may be used in the design area only.

It is particularly advantageous that the design area consists of PMMA, PC or acrylic. This material, which is known under a variety of brand names such as Plexiglas, is proven and suitable for the solution according to the invention.

In the invention, the design area is made of a material suitable for laser engraving; in particular, a material is used that is transparent to visible light.

The laser engraving creates a structure inside the plastic, which is protected from the outside.

In addition, it is advantageous that the design area has illumination. The illumination shows only the structure, but should not be recognizable as a separate external light source.

In one embodiment, the design area consists of a first and second plastic panel, wherein in the second plastic panel is connected to the illumination and serves as a light guide. This integrated solution enables configuration as a module for installation.

The trim element with the design area is particularly advantageous in the exterior of a vehicle, for example installed or injected in a bumper covering.

It is also advantageous for the trim element to be a part of the dashboard or information system, the inside of the door trim, or a switch or switch cover.

The method according to the invention for manufacturing a trim element consists of steps in which a trim element body is manufactured from a first plastic material, and subsequently or in parallel, a design area is manufactured from a second plastic material, and the design area is laser-treated, which generates a three-dimensional structure inside the plastic material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

Figure 1:
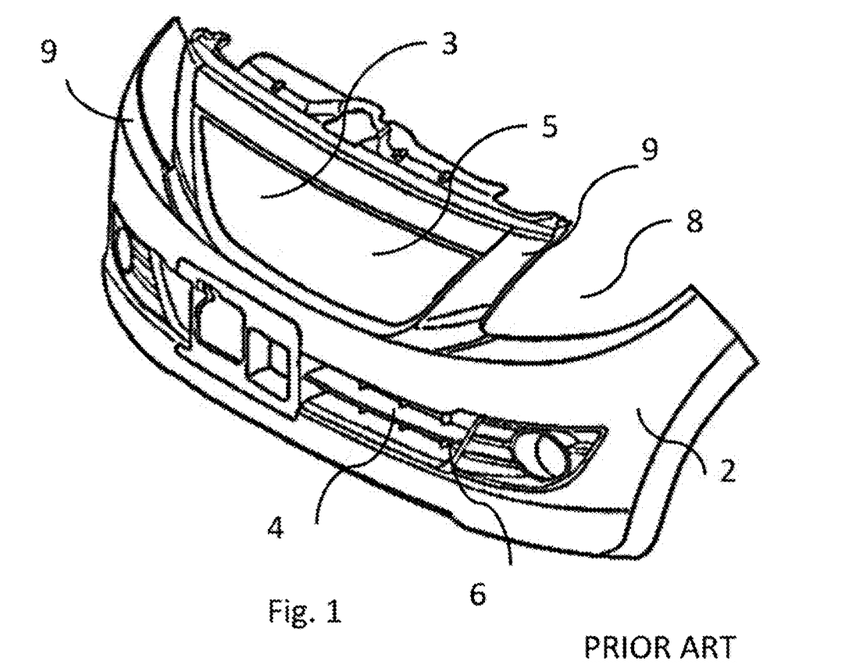
FIGS. 1 and 2 illustrate prior art bumper coverings.

FIG. 1 is a perspective view of a bumper covering 1. The bumper body 2 is provided with a large first opening 3 at the upper center in a vehicle width direction. In internal combustion engine vehicles, the opening 3 was filled by a radiator grille, which is no longer needed in an electric vehicle. The opening is filled by a front component 5, which may be structured and built in different ways.

In the bumper 1, an air inlet opening 4 elongated in a vehicle width direction is furnished at the lower center. A decorative trim part 6 is attached to the second air inlet opening 4 of the vehicle rear side. The trim part 6 extends in a vehicle width direction. In this case, lights, such as fog lights, are mounted on both sides of the air inlet opening 4 in a vehicle width direction. A left and right light shroud or panel 9, which cover and decorate the periphery of the lights mounted on the bumper body 2, are mounted on the bumper body 2 starting from the front of the vehicle. Reference numeral 8 denotes a hole for the light.

Figure 2:
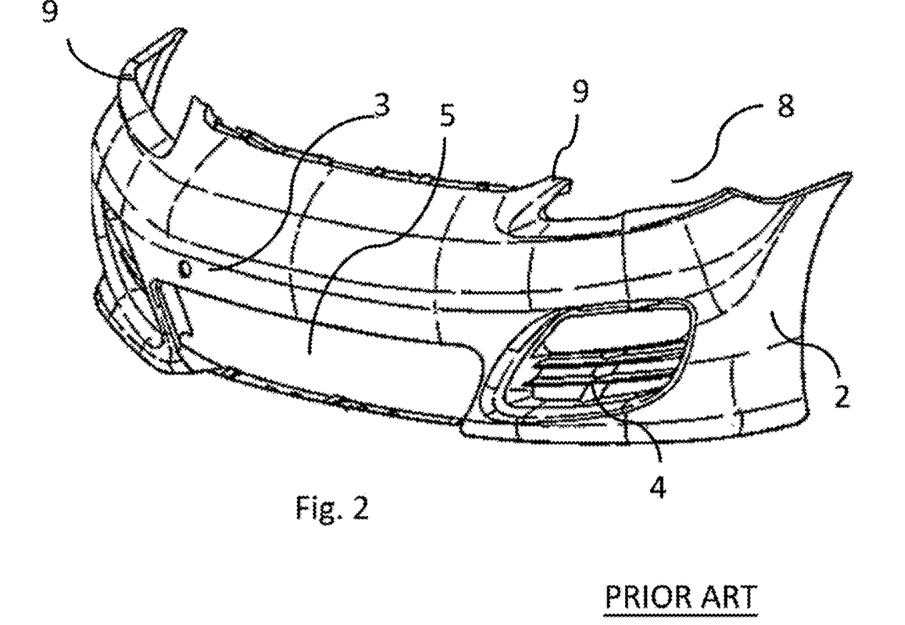

FIG. 2 shows a variant of a bumper 1. In this case, the opening 3, which was formerly used to accommodate a radiator grille, is arranged in the lower part of the bumper. The bumper body 2 extends above the opening and above the air inlet openings 4. The recesses 8 for the lights are only hinted at in this exemplary embodiment.

Figure 3A:
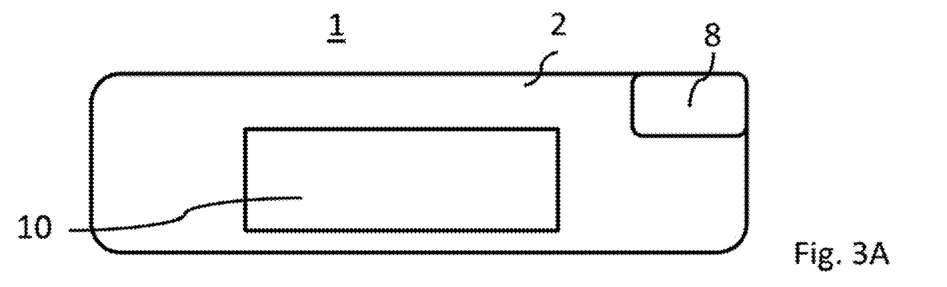
FIGS. 3A to 3C schematically show variants of trim elements.
Figure 3B:
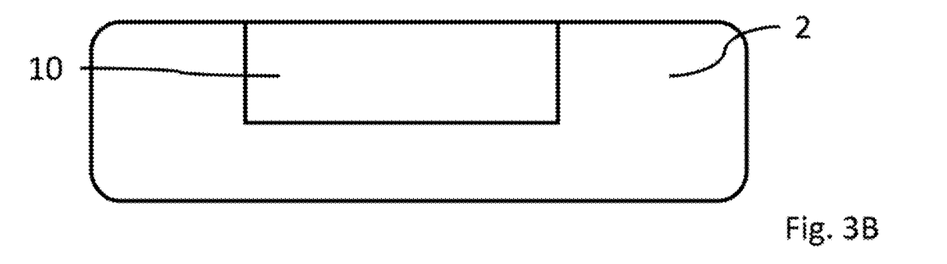
Figure 3C:
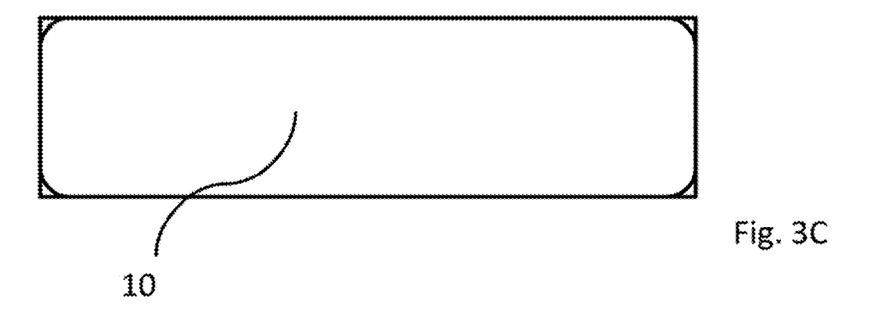

In FIGS. 3A-3C, trim elements 1 are also shown schematically, for example, for a bumper covering or rear covering 1. In the embodiment of FIG. 3A, a trim element body 2 is present, in which a front component 5 is integrated as a design area 10. The design area 10 is surrounded by the trim element body 2 on all four sides. For the manufacture of such a trim element, plastic injection molding may be used, in which different plastic materials are used in a 2K or 3K process. The trim element body 2 is adapted to the vehicle's shape and size, and has the respectively desired recesses and shapes. At the top right a recess 8 is indicated, for example for a light, possibly for a camera or another electrical part, such as a LiDAR laser. The design area 10 may also be made as a separate part, which is then connected to the trim element body in a suitable manner.

In the embodiment according to FIG. 3B, the design area 10 is integrated into the trim element body 2 only on three sides. This embodiment enables the design body, which has been manufactured separately, to be inserted into the trim element body.

In the embodiment according to FIG. 3C, no trim element body 2 is present or visible from the outside, and the design area 10 covers the entire area and is supported at most by a frame or an overlay that represents the trim element body 2.

The material of the trim element body 2 is generally a non-transparent, black or colored plastic such as for example ABS; PA6 or GF15. The outer surface may be painted with transparent protective varnish to prevent scratching and increase UV resistance. Of course, the outer surface may also be painted independently of the actual structuring according to the invention.

The material of the design area 10 is different from the base material of the trim element body 2; however, the same material may also be used. This material may be a multi-layered material, a material that is translucent for at least a portion of visible light, or a combination of both.

The material used is acrylic or polymethylmethacrylate (PMMA), a synthetic, glass-like thermoplastic material that is pliable when warm. This plastic is suitable for laser cutting and engraving with CO2 lasers. Both extruded and molded PMMA may be laser-treated.

Figure 4:
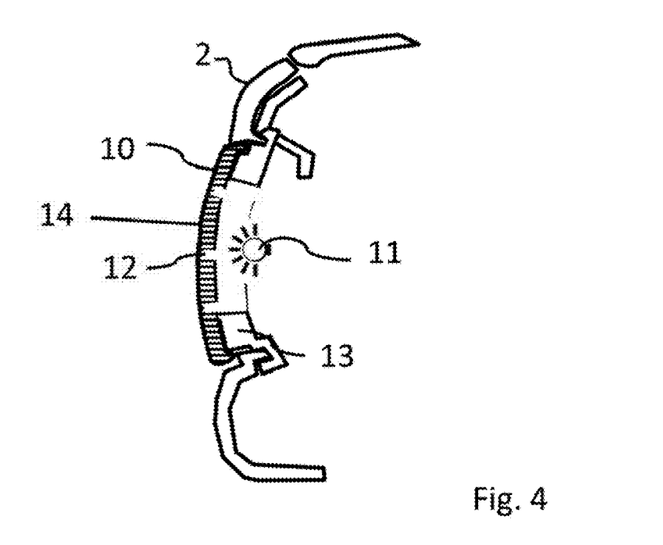
FIG. 4 illustrates a first embodiment of a trim element.

FIG. 4 shows an exemplary embodiment of a trim element 1 having a design area 10. The trim element 1 has a trim element body 2 that is made of plastic and carries brackets 13. The design area 10 is applied on the brackets 13. In this exemplary embodiment, the design area 10 is in the form of a plastic panel adapted to the outer contour of a vehicle, clipped to lugs present on this panel. However, all other possible mountings familiar to a person of ordinary skill in the art are also allowed. The design area 10 includes a plastic panel made of black PMMA material treated by means of a laser. The black material is transparent when it only has a residual thickness of about 1 mm and is illuminated. The plastic panel of the design area 10 is therefore treated with a laser beam that removes material in the channels 12 and leaves only a residual thickness of 1 mm in a predetermined structure. The treatment with the laser takes place either from the outside or from the inside, which has significant advantages. The structuring of the design area 10 with the laser from the inside creates a three-dimensional structure, but does not alter the smooth outer skin. As a result, the structure is protected from environmental influences and the outer surface 14 remains smooth and unprocessed. The term "unprocessed" in this context means only that the outer surface 14 is not structured by a laser. The outer surface remains smooth and follows only a given contour if required.

In the sectional view of FIG. 4 it may be seen that a strip arrangement has been generated, corresponding approximately to the slats of a radiator grille.

In order to make the structure visible from the outside, an illumination 11 is arranged inside the vehicle so that light shines through the transparent areas of the channels 12. The illumination takes place as flatly as possible, or along the structures created by laser beam, and may not be too bright, in compliance with legal requirements.

Thus, when the trim element protects the front of a vehicle as a bumper covering, the design area may be designed like a radiator grille.

However, the design area may also be a plastic panel that presents a logo of the vehicle manufacturer. The PMMA/PC/acrylic material is again weakened with a laser beam following the contour of the logo. The design area is then also illuminated from within the vehicle interior.

The structure of the design area 10, in the exemplary embodiment, is a simple plastic panel to which the illumination is attached, but the illumination may also be mounted in the vehicle itself.

However, it is also conceivable that the design area may be constructed in the form of a finished module in which the PMMA/PC/acrylic panel with the engraved structure comprises the illumination 11 and a housing that seals the illumination against the design area 10.

Figure 6:
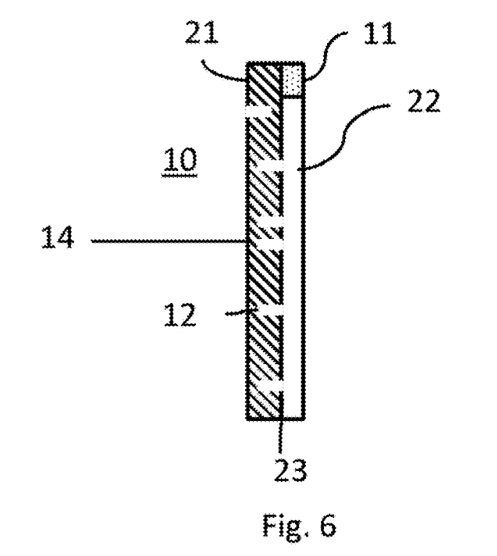
FIG. 6 illustrates a third embodiment of a trim element.

An alternative illumination is shown in FIG. 6. The first panel 21 of the design area 10, which is visible from the outside and manufacture from a colored PMMA material, is applied to a second plastic panel 22. The second plastic panel 22 is a transparent material that serves as a light guide to distribute light from the illumination 11 via the channels 12 of the first panel. The channels 12 in this exemplary embodiment are either introduced from the outside inward, into the first plastic panel 21, or are generated starting from the contact layer 23 in the interior of the material. The illumination may be an LED strip mounted in or on the light guide.

The plastic panels are produced in all forms necessary for the trim of a vehicle. They thus include not only flat plastic panels, but panels that follow the contour of the part they cover. The design areas 10 are installed on the exterior of the vehicle and also inside. The term "outer surface of the design area" refers to the surface visible to an observer. It is therefore an outer surface, as would be visible from the outside on the outer contour of a vehicle, as well as an outer surface as seen in viewing the design area in the interior of a vehicle.

Figure 5:
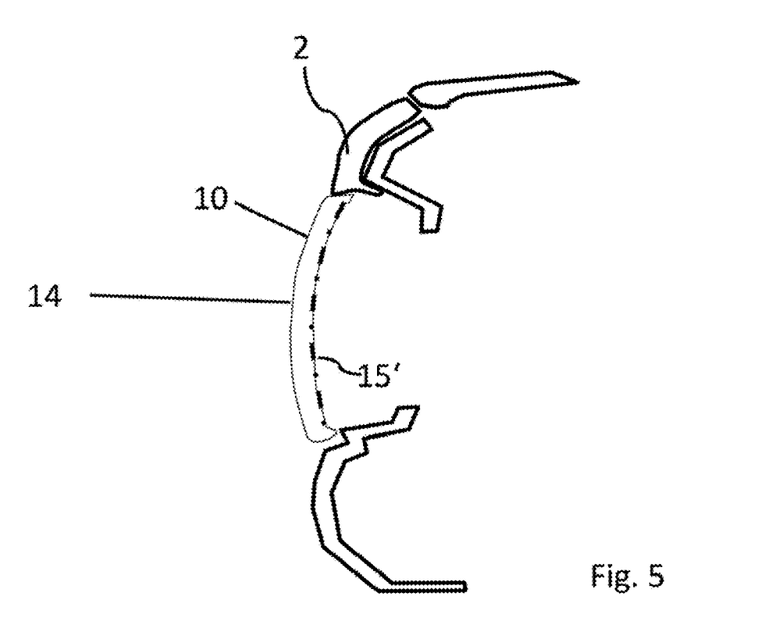
FIG. 5 illustrates a second embodiment of a trim element.

FIG. 5 shows an exemplary embodiment with a design area 10 made of a translucent material. The design area 10 consists of a panel of transparent acrylic, which is processed by a laser.

In the case of laser engraving on acrylic/PMMA/PC, the surface is removed by means of the laser. This means that even the finest details may be accurately displayed by laser engraving on acrylic. The result on transparent acrylic is a matt-white engraving, which may be used to represent, for example, a logo. In addition to acrylic glass in various colors, a multiplicity of two-layer plastic materials may be processed, in which the contact layer 23 is exposed by a laser engraving. In this embodiment as well, preferably, the inside of the design area 10 is structured with an engraving 15. Thus, the outside, i.e. the outer surface 14 of the trim element 1, remains smooth; the structure is embossed inside the plastic.

Even in the case of a transparent acrylic panel (/PC/PMMA) engraved with a laser, a structure with a plurality of layers is conceivable. The transparent acrylic panel may be covered on the inside by a foil that prevents seeing the parts located behind it. It is also possible that the acrylic layer is also provided with an illumination that may be present as a separate part, or as in the example of FIG. 6, may be applied as an additional photoconductive layer on the engraved acrylic panel.

Figures 7A, 7B:
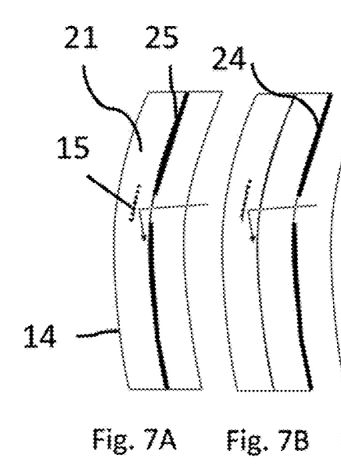
FIGS. 7A-7D, FIGS. 8A-8D and FIGS. 9A-9C illustrate further variant embodiments of a trim element.
Figures 7C, 7D:
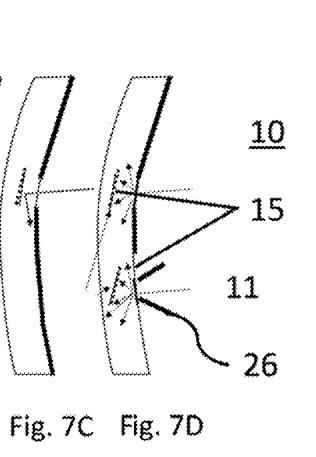
Figures 8A, 8B:
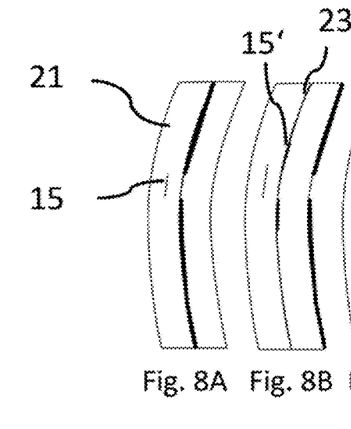
Figures 8C, 8D:
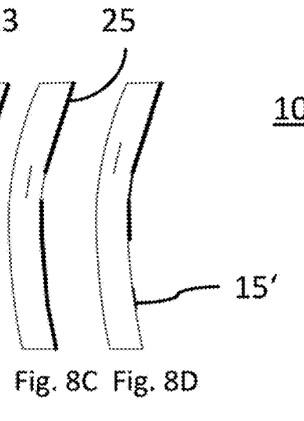

In FIGS. 7A-7D and FIGS. 8A-8D, variant embodiments are shown. In FIG. 8A, areas of laser engraving 15 are located inside the first plastic panel 21.

The design area 10 may also be transparent and lacquered/or foiled in black or color on the back. FIG. 7A shows a two-part structure with a first and second plastic panel 21, 22, between which a lacquer layer or foil 25 is arranged. The lacquer layer or foil has an exemplary interruption: at this location, a laser makes an inner engraving 15 through the lacquer layer or foil 25.

In the embodiment according to FIG. 7B, the lacquer layer is applied to the inner surface of the two-part plastic panel, and in turn has an interruption which serves as a shutter for the laser.

FIG. 7C shows a design area made of a single plastic panel, which is likewise covered on the inside with a lacquer layer. The inner engravings shown in FIGS. 7A to 7C lie approximately parallel to the outer surface of the design areas 10.

A further alternative embodiment is shown in FIG. 7D, in which the laser inner engraving 15 is not engraved parallel to the plastic panel. In the interruptions of the lacquer layer, an additional external laser engraving 15' is indicated.

FIGS. 8A to 8D show further variants. Again, design areas 10 are made with a single plastic panel or a combination of two plastic panels. In FIG. 8B, no lacquer layer or foil is applied in the contact region 23; instead, there is only an external laser engraving.

Figures 9A, 9B:
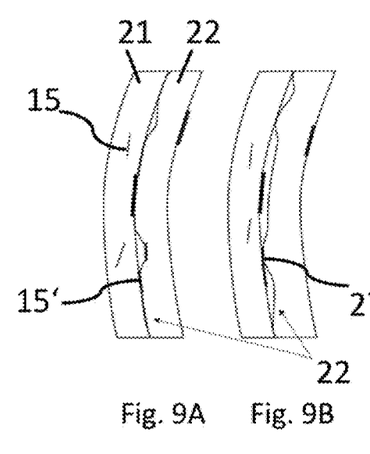
Figure 9C:
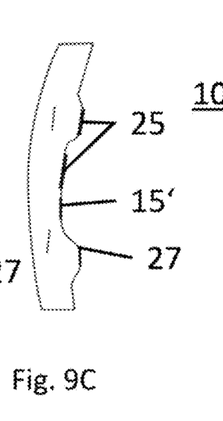

The embodiments in FIGS. 9A-9C differ significantly from the embodiments described above. These are individual plastic panels or combined plastic panels, which however have a three-dimensional structure. In this case, the three-dimensional structure, which presents elevations and recesses, is always away from the outer surface of the design area 10, so that the outer surface is always smooth and unprocessed.

FIG. 9A shows a combination of two plastic panels. These plastic panels contain a structure on their contact surface 23 that may be generated by a laser. Alternatively, the contours are already produced when the plastic panel is manufactured in an injection molding tool.

Material, which may be metallic or colored, may be applied to such a pre-contoured plastic panel by means of a hot-stamping foil or pad printing. As a result, the structures are further emphasized and the three-dimensional impression is reinforced. Exemplary laminated regions 27 of this kind may be seen at different places. In addition, inner surfaces may be lacquered and may have a lacquer layer or foil layer 25, and both inner engravings 15 and outer engravings 15' may be carved by a laser.

By means of foiled or lacquered areas 27 and extra components with light deflectors and structures, a kind of labyrinth may be created, that distributes and dissipates the light of the backlight like a prism.

When using two plastic panels, a combination with a colored plastic panel is also used.

Independently of the description given above, the trim element 1 according to the invention may also be installed in the vehicle interior. In this case, there are different components in the interior. For example, the trim element may be used in the dashboard. Indications of the vehicle manufacturer are also often integrated into the dashboard.

The trim element 1 may thus be used in any plastic component of the interior, as partial or complete component.

Particularly advantageous is the use of the trim element as a cover for a switch or as a switch itself. As a result of the inner engraving of a symbol, the trim element has information content that the user needs to operate the switch. The information content is retained because the inner engraving is protected against abrasion. In contrast to printed symbols, this information will not be rubbed off over time by use.

When using the trim part as a switch, a light source may also be introduced toward the front of the switch. Thus, for example, an indirect light is emitted from behind onto the face, so that the three-dimensional symbol is better presented.

The light source may also be mounted in the front area—i.e. the light source may be mounted above and/or below, and/or laterally, on the face.

The method according to the invention for producing a trim element 1 comprises the following steps: a trim element body 2 is manufactured from a first plastic material, subsequently or in parallel, a design area 10 is manufactured from a second plastic material, the design area 10 is processed with a laser treatment that produces a three-dimensional structure either inside the plastic material or on a side not visible from the outside.

Different methods of treating plastic with a laser are used. The means of inner engraving, outer engraving, and removal are used on a surface of the plastic panel of the design area 10.

In an additional method step, the plastic material, the plastic panels 21 and 22 are molded in a plastic injection molding process, and thus are prestructured. The structure formed in this way is always installed turned away, or at least concealed, from the outer surface of the design area.

In additional method steps, at least one of the plastic panels is completely or partially coated, printed, foiled, varnished.

In an alternative method, at least one plastic panel is engraved with the laser in a flat state and only then brought to its desired final shape by deformation.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF REFERENCE SIGNS

1 Bumper covering, trim element
2 Bumper body, trim element body
3 First opening
4 Air inlet opening
5 Front component
6 Trim part
8 Hole for light
9 Light shroud or panel
10 Design area
11 Illumination
12 Channel
13 Bracket
14 Outer surface
15 Inner engraving
15' Outer engraving
21 First plastic panel
22 Second plastic panel
23 Contact layer
24 Inner surface
25 Lacquer layer/foil
26 Light guide
27 Laminated areas

What is claimed is:

1. A trim element in a vehicle, comprising:
at least one trim element body and a design area located on the trim element, wherein the design area is treated to individualize the vehicle appearance or for informational purposes, wherein the design area includes at least one first plastic panel made of a transparent material suitable for laser engraving and providing for a three-dimensional appearance, wherein the first plastic panel has an outer surface being un-engraved, and an inner surface defining a laser engraving extending therein toward the outer surface such that the laser engraving is visible through the un-engraved outer surface while being protected by the un-engraved outer surface, and wherein the design area further includes a second plastic panel of a transparent material overlying the engraved surface of the first plastic panel.

2. The trim element according to claim 1, wherein the design area is incorporated or injected into the at least one trim element body and is made of a different material than the at least one trim element body.

3. The trim element according to claim 1, wherein the design area consists at least partially of PMMA, PC or acrylic materials.

4. The trim element according to claim 1, wherein an illumination source is located in alignment with the design area.

5. The trim element according to claim 1, wherein an illumination source is aligned with the second plastic panel such that the second plastic panel is used as a light guide.

6. The trim element according to claim 1, wherein the design area is installed or injected in a bumper covering of the vehicle.

7. The trim element according to claim 1, wherein the design area is a dashboard, an information system, a side region of a door, a switch cover, or switch.

8. The trim element according to claim 1, wherein a laminated area is located along at least one of the outer and inner surfaces of the first plastic panel.

9. The trim element according to claim 1, wherein the first plastic panel is colored.

10. A method for producing a trim element according to claim 1, wherein the at least one trim element body is produced from a first plastic material, and subsequently or in parallel the design area is produced from a second plastic material, wherein the inner surface of the first plastic panel of the design area is laser-treated to produce the laser engraving.

11. The method according to claim 10, wherein the laser treating takes place before or after a step of deformation of the trim element body.

12. The trim element for a vehicle of claim 1 further including at least one foil layer positioned against the inner surface of the first plastic panel between the first plastic panel and the second plastic panel.

13. The trim element for a vehicle of claim 12, wherein the at least one foil layer defines at least one interruption to allow light to pass through the first plastic panel.

14. The trim element for a vehicle of claim 13, wherein the at least one interruption is in alignment with the laser engraving of the inner surface of the first plastic panel.

15. The trim element for a vehicle of claim 14 further including an illumination source connected to the second panel.

16. A trim element for a vehicle, comprising:
a trim element body;
a design area supported by the trim element body;
the design area including a first plastic panel of a transparent material, the first plastic panel having an outer surface defining an exterior surface of the vehicle and an inner surface facing inwardly away from the exterior surface of the vehicle;
the outer surface being un-engraved;
the inner surface defining a laser engraving extending therein toward the outer surface such that the laser engraving is visible through the un-engraved outer surface while being protected by the un-engraved outer surface;
the design area further including a second plastic panel of a transparent material, the second plastic panel overlying the engraved surface of the first plastic panel.

17. The trim element for a vehicle of claim 16 further including at least one foil layer positioned against the inner surface of the first plastic panel between the first plastic panel and the second plastic panel.

18. The trim element for a vehicle of claim 17, wherein the at least one foil layer defines at least one interruption to allow light to pass through the first plastic panel.

19. The trim element for a vehicle of claim 16 wherein the inner surface of the first plastic panel presents a plurality of elevations and recesses and wherein the second plastic panel includes a plurality of elevations and recesses that lie flush with the elevations and recesses of the first plastic panel.

20. The trim element for a vehicle of claim 16 wherein a plurality of foil layers are located on the inner surface of the first plastic panel in spaced relationship with one another for deflecting light in a predetermined pattern.

* * * * *